United States Patent
Yeung et al.

(10) Patent No.: US 11,449,952 B2
(45) Date of Patent: Sep. 20, 2022

(54) EFFICIENTLY MODELING DATABASE SCENARIOS FOR LATER USE ON LIVE DATA

(71) Applicant: ORACLE INTERNATIONAL CORPORATION, Redwood Shores, CA (US)

(72) Inventors: Chi Ken Yeung, San Ramon, CA (US); Ravi Shankar, Cupertino, CA (US); Sondhi, Fremont, CA (US); Amira Morcos, San Ramon, CA (US); Eva Kifri, Antioch, CA (US); Dave Altendorf, San Ramon, CA (US); Qing Du, Pleasanton, CA (US); Hsiaowen Mou, Brentwood, CA (US); David Bell, Folsom, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 295 days.

(21) Appl. No.: 13/632,642

(22) Filed: Oct. 1, 2012

(65) Prior Publication Data
US 2014/0095233 A1 Apr. 3, 2014

(51) Int. Cl.
*G06Q 10/06* (2012.01)
*G06F 16/21* (2019.01)
*G06Q 40/00* (2012.01)

(52) U.S. Cl.
CPC .......... *G06Q 40/12* (2013.12); *G06F 16/21* (2019.01); *G06Q 10/06375* (2013.01)

(58) Field of Classification Search
None
See application file for complete search history.

(56) References Cited

U.S. PATENT DOCUMENTS 7,873,684 B2  1/2011  Souder et al.
8,160,850 B2  4/2012  Jain et al.
(Continued)

FOREIGN PATENT DOCUMENTS

WO   WO-2012/075623 A1 *  6/2012  ....... G06F 17/30292

OTHER PUBLICATIONS

Auditore, Peter—"In-Memory Technology: Innovation in Business Intelligence?"—May 28, 2012, [retrived on Oct. 15, 2014], retrieved from the internet URL<http://sandhill.com/article/in-memory-technology-innovation-in-business-intelligence/>.*

*Primary Examiner* — Giuseppi Giuliani
(74) *Attorney, Agent, or Firm* — Kilpatrick, Townsend and Stockton LLP

(57) ABSTRACT

A method of modeling a scenario for use with live data in a production database may include selecting the scenario. The live data can be stored in the production database on a first computing resource, and production scenarios can be stored and executed on the live data using the first computing resource. The method may also include identifying a subset of the live data that are affected by the scenario, copying the subset to a second computing resource to create modeling data, running the scenario on the modeling data using the second computing resource, causing a display device to provide an output comprising a result of the scenario on the modeling data, receiving an input indicating that the scenario is approved, and storing the scenario with the plurality of production scenarios for use on the first computing resource.

19 Claims, 10 Drawing Sheets

(56) References Cited

U.S. PATENT DOCUMENTS

| | | | |
|---|---|---|---|
| 8,161,085 B2 | 4/2012 | Souder et al. | |
| 8,175,857 B2 | 5/2012 | Jain et al. | |
| 2003/0236721 A1* | 12/2003 | Plumer et al. | 705/30 |
| 2006/0041458 A1* | 2/2006 | Ringrose et al. | 705/7 |
| 2007/0094381 A1* | 4/2007 | Weiss | H04L 41/0806 709/224 |
| 2007/0118419 A1* | 5/2007 | Maga et al. | 705/10 |
| 2007/0143353 A1* | 6/2007 | Chen | 707/200 |
| 2007/0150384 A1* | 6/2007 | John et al. | 705/30 |
| 2007/0179872 A1* | 8/2007 | Macalka et al. | 705/35 |
| 2009/0083119 A1* | 3/2009 | Mided et al. | 705/10 |
| 2011/0093436 A1* | 4/2011 | Zha | G06F 17/30592 707/639 |
| 2011/0246250 A1* | 10/2011 | Abraham | G06Q 10/06 705/7.12 |
| 2013/0080299 A1* | 3/2013 | Dhakephalkar | G06Q 40/02 705/30 |
| 2013/0080349 A1* | 3/2013 | Bhola et al. | 705/348 |
| 2013/0166468 A1* | 6/2013 | Vogelgesang et al. | 705/330 |
| 2013/0238657 A1* | 9/2013 | Brand et al. | 707/770 |
| 2013/0245804 A1* | 9/2013 | Sinzig et al. | 700/100 |
| 2014/0040867 A1* | 2/2014 | Wefers | G06F 11/3684 717/131 |
| 2014/0058799 A1* | 2/2014 | Gottemukkala | 705/7.37 |
| 2014/0089039 A1* | 3/2014 | McClellan | G06Q 10/0635 705/7.28 |

* cited by examiner

FIG. 6

Profit & Loss Comparison

Project: HARDWARE
Month Ending: June 30, 2012

| | Scenario #1 | Scenario #2 | Variance | % |
|---|---|---|---|---|
| Revenue | | | | |
| Product Revenue | $xxx,xxx.xx | $xxx,xxx.xx | $xxx,xxx.xx | 100.00 |
| Service Revenue | $xxx,xxx.xx | $xxx,xxx.xx | $xxx,xxx.xx | 100.00 |
| Total Revenue | $xxx,xxx.xx | $xxx,xxx.xx | $xxx,xxx.xx | 100.00 |
| Expenses | | | | |
| Cost of Sales | $xxx,xxx.xx | $xxx,xxx.xx | $xxx,xxx.xx | 100.00 |
| Selling, General & Admin | $xxx,xxx.xx | $xxx,xxx.xx | $xxx,xxx.xx | 100.00 |
| Salaries and Benefits | $xxx,xxx.xx | $xxx,xxx.xx | $xxx,xxx.xx | 100.00 |
| Office and Building | $xxx,xxx.xx | $xxx,xxx.xx | $xxx,xxx.xx | 100.00 |
| Travel | $xxx,xxx.xx | $xxx,xxx.xx | $xxx,xxx.xx | 100.00 |
| Taxes | $xxx,xxx.xx | $xxx,xxx.xx | $xxx,xxx.xx | 100.00 |
| Depreciation | $xxx,xxx.xx | $xxx,xxx.xx | $xxx,xxx.xx | 100.00 |
| Total Expenses | $xxx,xxx.xx | $xxx,xxx.xx | $xxx,xxx.xx | 100.00 |
| Net Income | $xxx,xxx.xx | $xxx,xxx.xx | $xxx,xxx.xx | 100.00 |

EFFICIENTLY MODELING DATABASE SCENARIOS FOR LATER USE ON LIVE DATA

BACKGROUND

In today's modern business computing environment, Enterprise software is often used to manage any and all operations of a business. Enterprise software is used to manage large amounts of data that can be used in financial transactions that are assigned to departments within an Enterprise. In particular, funds, revenues, expenses, and other accounting units often need to be assigned to individual projects and/or departments in the form of, for example, accounting ledger entries in a general ledger application. These accounting ledger entries can be generated periodically using automatic processes.

Within an Enterprise, customers often need timely and accurate decision support to manage the business. For customers with large or complex business processes, it can be particularly challenging to quickly model the impact that changes will have on existing processes. Often times, running automatic periodic processes within an Enterprise software system can take hours or days to complete, due to the large number of transactions and calculations that need to be performed. Additionally, these periodic processes may significantly affect values stored within a general ledger, and may be difficult to reverse. Changes to processes, such as allocation business rules, may have effects on a business's bottom line that are difficult to predict until these changes or actually implemented and the result of the new allocations can be reviewed.

BRIEF SUMMARY

In one embodiment, a method of efficiently modeling a scenario for use with live data in a production database may be presented. The method may include defining or selecting the scenario. The live data may be stored in the production database on a first computing resource, and a plurality of production scenarios may be stored and executed on the live data using the first computing resource. The method may also include identifying a subset of the live data that are affected by the scenario, and copying the subset of the live data to a second computing resource to create modeling data. The second computing resource may be configured to run the scenario faster than the first computing resource. The method may additionally include running the scenario on the modeling data using the second computing resource, and causing a display device to provide an output comprising a result of the scenario on the modeling data. The method may further include receiving an input indicating that the scenario is approved to be run on the first computing resource, and storing the scenario with the plurality of production scenarios for use on the first computing resource.

In another embodiment, a computer-readable memory may be presented. The computer-readable memory may have stored thereon a sequence of instructions which, when executed by one or more processors, causes the one or more processors to efficiently model a scenario for use with live data in a production database by defining or selecting the scenario. The live data may be stored in the production database on a first computing resource, and a plurality of production scenarios may be stored and executed on the live data using the first computing resource. The one or more processors may also operate by identifying a subset of the live data that are affected by the scenario, and copying the subset of the live data to a second computing resource to create modeling data. The second computing resource may be configured to run the scenario faster than the first computing resource. The one or more processors may additionally operate by running the scenario on the modeling data using the second computing resource, and causing a display device to provide an output comprising a result of the scenario on the modeling data. The one or more processors may further operate by receiving an input indicating that the scenario is approved to be run on the first computing resource, and storing the scenario with the plurality of production scenarios for use on the first computing resource.

In yet another embodiment, a system including one or more processors and a memory communicatively coupled with and readable by the one or more processors may be presented. The memory may have stored thereon a sequence of instructions which, when executed by one or more processors, causes the one or more processors to efficiently model a scenario for use with live data in a production database by defining or selecting the scenario. The live data may be stored in the production database on a first computing resource, and a plurality of production scenarios may be stored and executed on the live data using the first computing resource. The one or more processors may also operate by identifying a subset of the live data that are affected by the scenario, and copying the subset of the live data to a second computing resource to create modeling data. The second computing resource may be configured to run the scenario faster than the first computing resource. The one or more processors may additionally operate by running the scenario on the modeling data using the second computing resource, and causing a display device to provide an output comprising a result of the scenario on the modeling data. The one or more processors may further operate by receiving an input indicating that the scenario is approved to be run on the first computing resource, and storing the scenario with the plurality of production scenarios for use on the first computing resource.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 6 illustrates an interface for reviewing scenario results, according to a first embodiment.

DETAILED DESCRIPTION

Figure 1:
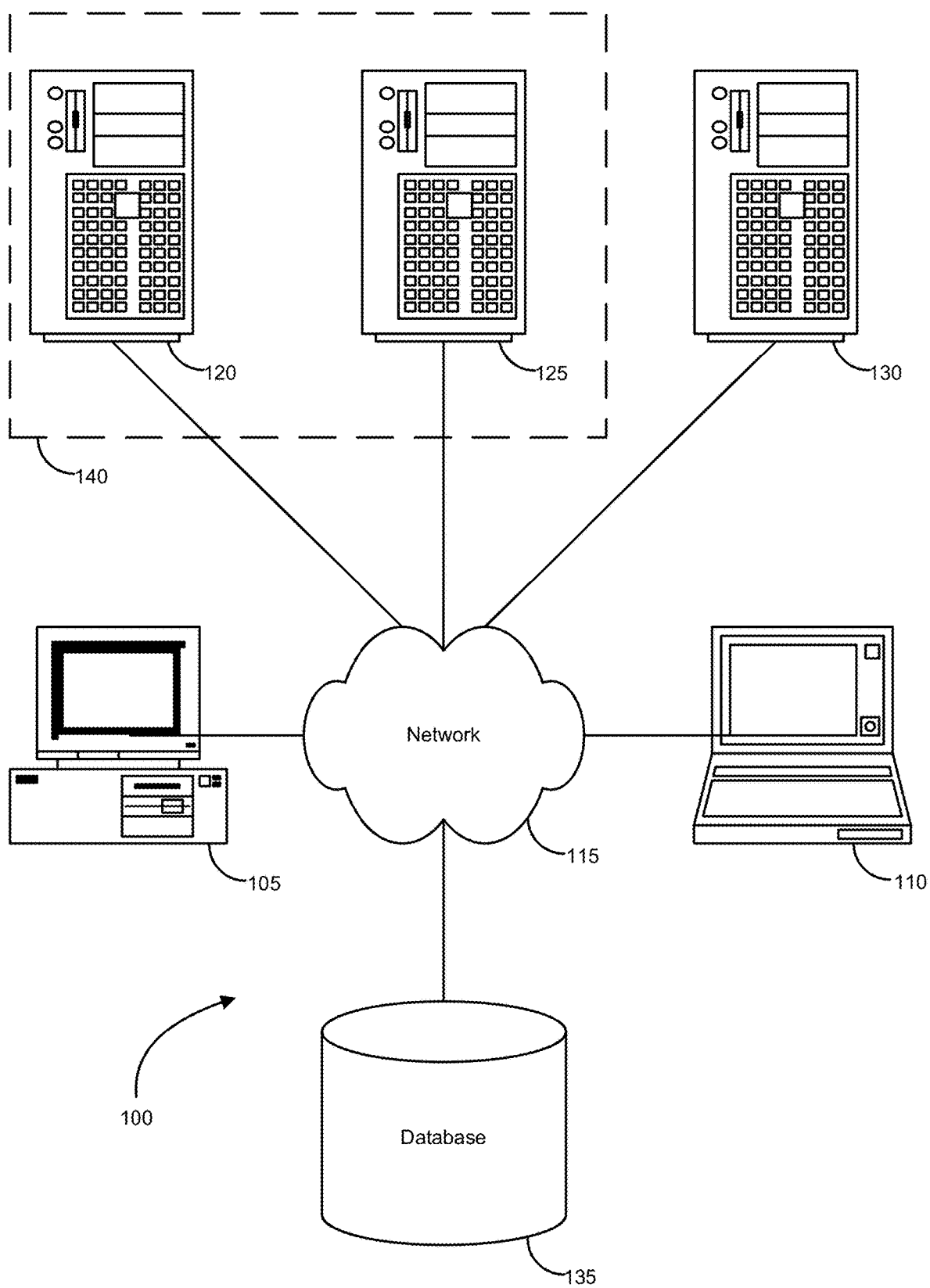
FIG. 1 illustrates a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for efficiently modeling scenarios to be implemented on live data in a production database system. Production database systems operated by Enterprise software are often very large and complex. Any change made to operations that are scheduled to run on the database can have rippling effects through the various values stored thereon. In many cases, once a process is run on the database, it can be very difficult to reverse the effects of that process. Furthermore, the database may often be required to be in constant use by the Enterprise. Taking the database off-line to either reverse processes that have already been run, or to test processes to see their effects on the bottom line of organizations within the Enterprise could make critical systems and data unavailable for long periods of time.

Because customers need timely and accurate data in order to support changes in business processes, and because the production database needs to be constantly available to the Enterprise, the production database cannot feasibly be used to test new processes. Therefore, the embodiments described herein present methods and systems that allow different scenarios to be modeled for use in the live data of the production database, without affecting its availability or reliability. According to one embodiment, a scenario may be selected or defined for testing. A subset of the live data in the production database that will be affected or used by the scenario can be identified and stored in a computing resource that is different from the computing resource used by the production database. In many cases, the computing resource used for modeling will be able to perform the scenarios much faster than the larger production database computing resource. In one embodiment, multiple scenarios may be run the same time against the same data set, and the results may be displayed to a user. One of the scenario alternatives can be selected and then stored with a plurality of production scenarios to be run on the live data in the production database.

A number of different processes may operate on the live data. As used herein, an application process comprises a single function to be carried out on the live data. One example of an application process is an allocation rule. Allocation rules are used to allocate funds from a source to one or more targets using a basis. For example, overhead costs may be allocated from one account to the expense ledgers of different departments occupying the same building space. The basis for this allocation can be the population of each department, the square footage occupied by each department, the power usage of each department, the computing resources consumed by each department, and/or the like. For instance, overhead expenses could be allocated to each department in a manner proportional to the number of employees assigned to each department. The allocation rule can be scheduled to run periodically, such as weekly or monthly, in an automatic fashion on the live data. Therefore, funds can be automatically scheduled to be dispersed using allocation rules that are stored in a production scenario database. Other examples of application processes involve money transfers and accounting cycle closures.

Another type of process that operates on live data includes business processes. In one sense, a business process may be comprised of a plurality of application processes. In other words, a business process may be built using a number of different application processes. For example, when allocating revenues, a number of different allocations can be made, funds can be transferred, ledgers can be balanced, cash flow statements can be generated, and/or the like. Each business process can be changed by either substituting different application processes, or by changing the order in which the various application processes are run.

As used herein, the generic term "scenario" can be used to describe any operation that is done using or affecting live data from a production database, whether it is an application process, a business process, or any other type of operation. The term "production database" is used to refer to a database containing live data that is used in the day-to-day operations of an organization. One example of a production database is a general ledger product that manages accounting transactions and balances. Such a general ledger software product is available from Oracle®, along with many other sources.

In addition to supporting operations on a general ledger, the embodiments described herein can also be used to operate on accounting systems that allocate funds according to projects. For example, some organizations will define resource allocations based on a project number. This can sometimes use a different software product than a general ledger, however, some products are able to integrate project tracking with the general ledger.

Prior to this disclosure, in order to see the results of scenario to be tested, a customer would have to clone the production database, implement the scenario, run the scenario on the cloned the data, and review the results. The scenario to be tested would have to be run on the same computing resource as the live data. This resulted in a very long, tedious, and error-prone process. The difficulty of testing scenarios to be implemented on live data was often so great that customers were unable to test scenarios before they were implemented. This led to accounting mistakes and financial errors in balance sheets and financial reports.

In contrast, the embodiments presented herein streamline the testing process. This allows customers to very quickly see the effects of different scenarios and changes to those scenarios before they are actually implemented in the production database. For customers with complex business processes, the huge challenge of quickly modeling the impact of allocation rule changes and efficiently assessing the impact of material transactions on the bottom line can be simplified. Customers can run simulations of accounting cycle close operations multiple times before they finally close their books. Most importantly, the embodiments herein do not require customers to manually create a copy of the entire production database and allow users to model scenario changes in a connected and seamless user experience.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
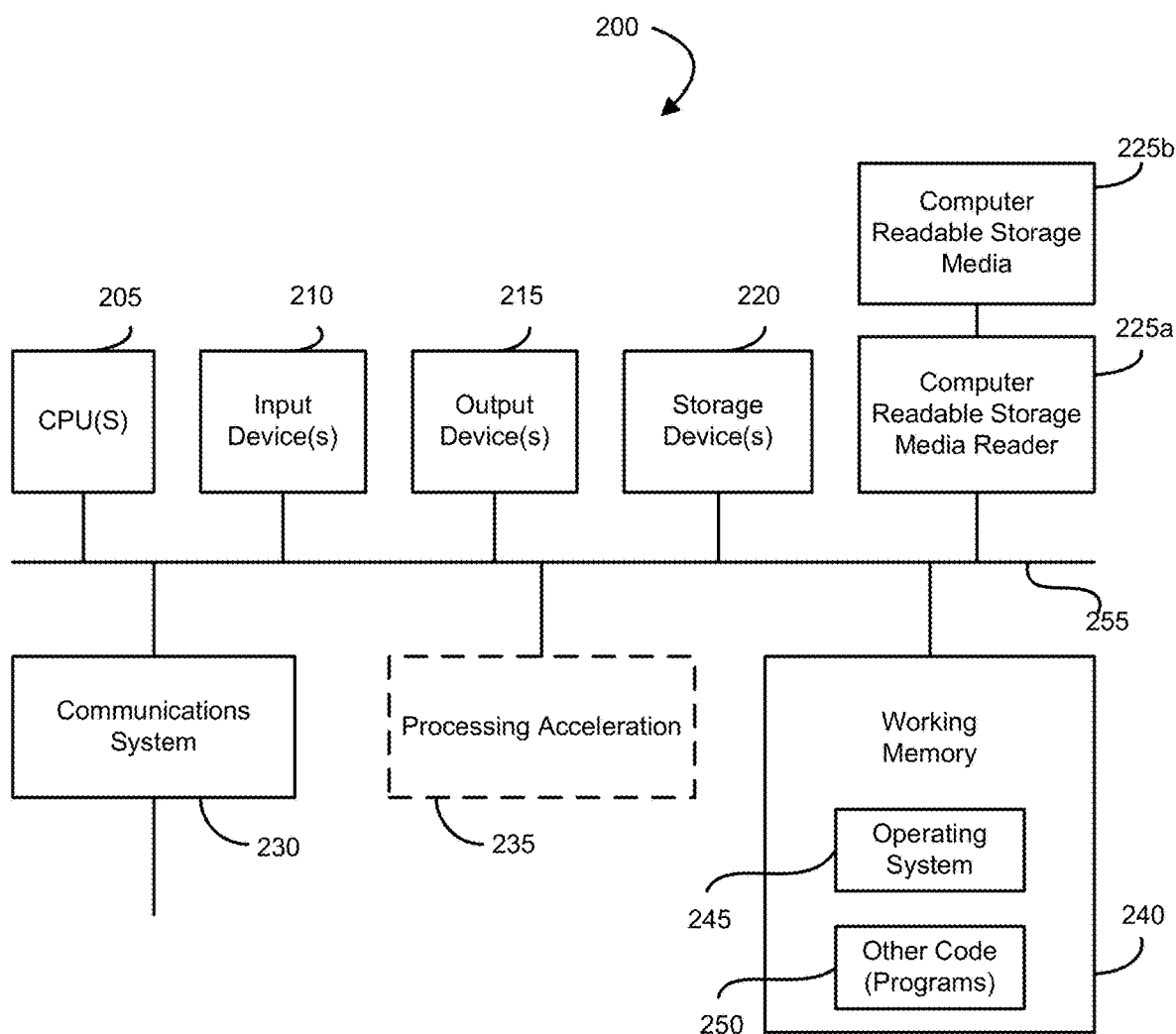
FIG. 2 illustrates a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods may be implemented by a computer system, such as computer system 200 in FIG. 2. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

According to some of the embodiments discussed herein, a subset of the live data can be maintained for a time interval separately from the live data for use in modeling scenarios. As such, the live data and the modeling data may be stored or processed using distinct computing resources. As used herein, the term "computing resource" can be used to refer to any computer hardware or software data structure used by a database system. In one embodiment, separate memory locations within the same database structure can be considered separate computing resources. In another embodiment, separate memories in the same computer system can be considered separate computing resources. According to yet another embodiment, separate memories stored on separate computer systems may be considered separate computing resources. FIGS. 3-6 further illustrates each of these embodiments.

Figure 3:
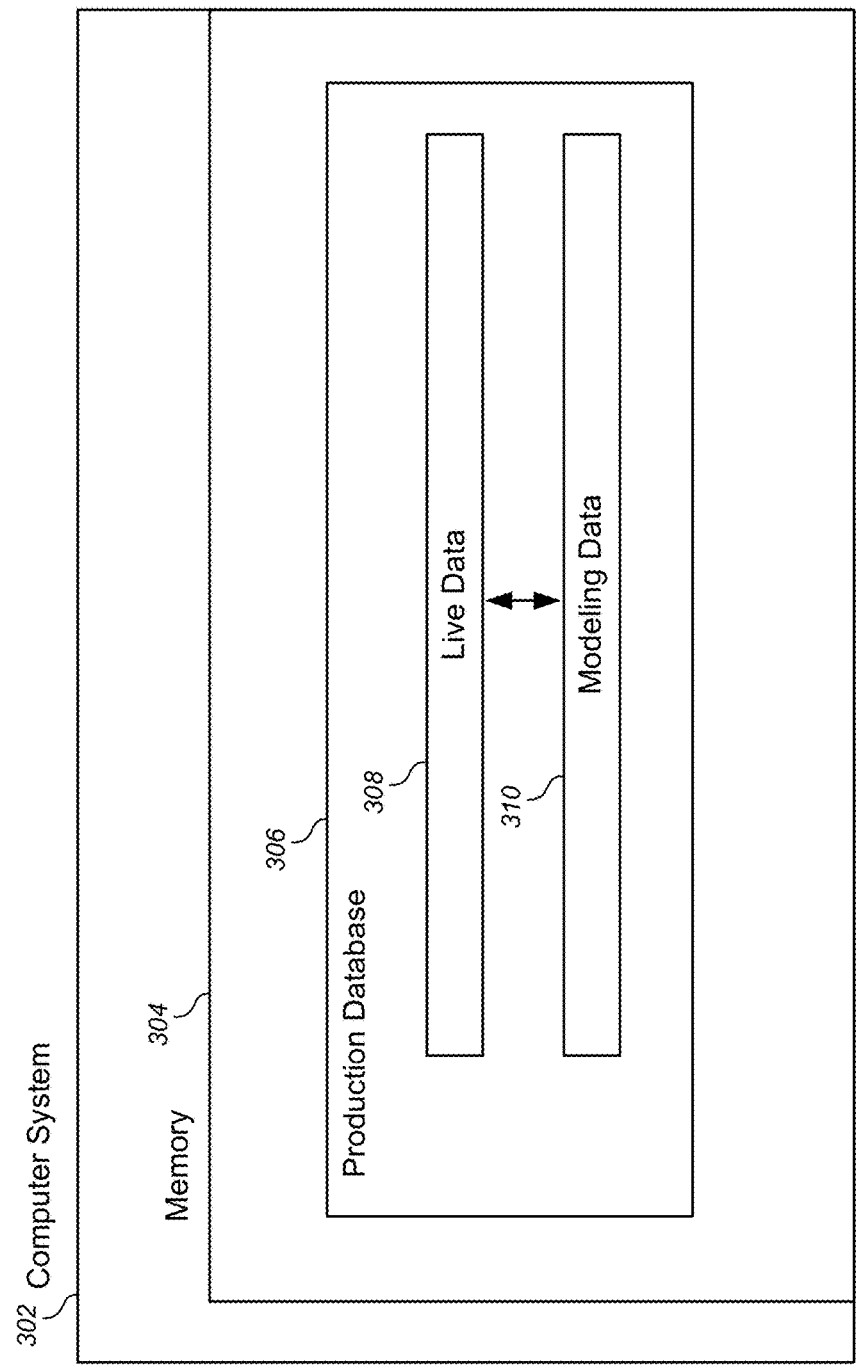
FIG. 3 illustrates a block diagram of a data storage arrangement, according to a first embodiment.

FIG. 3 illustrates a block diagram 300 of a data storage arrangement, according to a first embodiment. The computer system 302 may be similar to the computer system 200 described in FIG. 2. The computer system 302 may also be composed of a number of separate computer systems operating in a networked fashion, such as those discussed in relation to FIG. 1. In this embodiment, the computer system 302 is the computer system used to store and process the production database. Here, memory 304 stores the live data 308. The memory 304 may consist of one or more hard disk drives, or arrays, or any other type of nonvolatile memory storage. Memory 304 may also include distributed memories, and/or multilevel memories, such as multilevel caches, registers, and/or the like.

In this embodiment, modeling data 310 may be stored in the same memory 304 as the live data 308. For example, the modeling data 310 may be created and stored by adding an entry to the existing production database in tables where values are stored. For example, a table in the production database storing balances in an accounting ledger may be augmented to include additional values that can be used for modeling. The modeling data 310 may be refreshed before any new scenarios are run, such that the modeling data 310 reflects the most recent value stored in the live data 308. Therefore, the memory locations storing the live data 308 within memory 304 can be considered a first computing resource, and the memory locations storing the modeling data 310 within memory 304 can be considered a second computing resource.

It should be noted that this embodiment does not store a copy of the entire production database. Instead, only a subset of the live data 308 is stored as modeling data 310. In many cases, because the modeling data 302 is much smaller, scenarios run using the modeling data 302 can operate much faster. Additionally, if it is decided that the scenario should not be implemented in the production database, all of the values stored in the modeling data 310 can be viewed as temporary, while the live data 308 remains intact.

Figure 4:
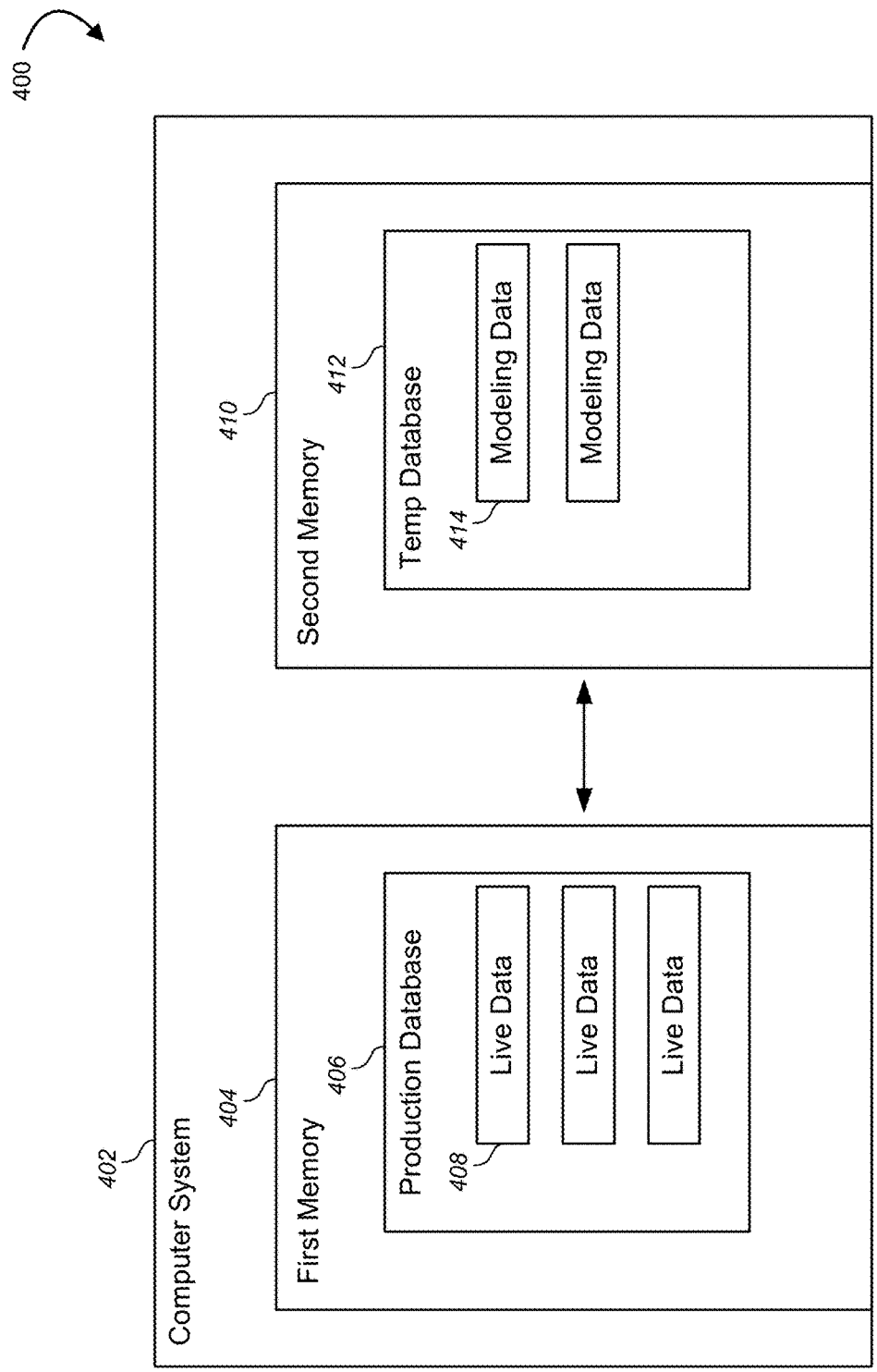
FIG. 4 illustrates a block diagram of a data storage arrangement, according to a second embodiment.

FIG. 4 illustrates a block diagram 400 of a data storage arrangement, according to a second embodiment. In this embodiment, computer system 402 can include at least two separate memories. The first memory 404 can include the production database 406 that maintains and operates on the live data 408. In this embodiment, a subset of the live data that will be used or affected by a test scenario can be copied to a temporary database 412. The subset of the live data, or the modeling data 414, can then be processed using the computer system 402 while residing within the second memory 410. Therefore, the first memory 404 storing the live data 408 can be considered a first computing resource, and the second memory 410 storing the subset of live data 408 referred to as the modeling data 414 can be considered a second computing resource.

In this embodiment, the second memory 410 may be significantly faster than the first memory 404. For example, the first memory 404 may include a physical array of hard disks, while the second memory 410 may be implemented using RAM or cash memory of the computer system 402. In one particular variation of this embodiment, a software product known as an in-memory database can be used to implement the temporary database 412. An in-memory database has the advantage of streamlined operations, faster memory, and a smaller data set on which to operate.

One such in-memory database is available from Oracle® as a product known as TimesTen®. The in-memory database can be deployed and connect to a customer's existing production database environment. In some cases, general ledger processing can take place on the in-memory database, such as allocations, post, average daily balance, revaluation, translation, year-and close, and/or the like. In some cases, up to an entire year of selected fiscal data can be maintained in smaller ledgers on the in-memory database. In another case, all accounting journals that need to be processed within a time interval can be transferred to the in-memory database. In some cases, the in-memory database can be expanded to handle many gigabytes of data. However, the speed of in-memory processing can be leveraged to significantly reduce the time it would take to test scenarios on actual financial records. Actual processing performance using the in-memory database for a subset of the live data can be up to ten times more efficient than using the production database.

Figure 5:
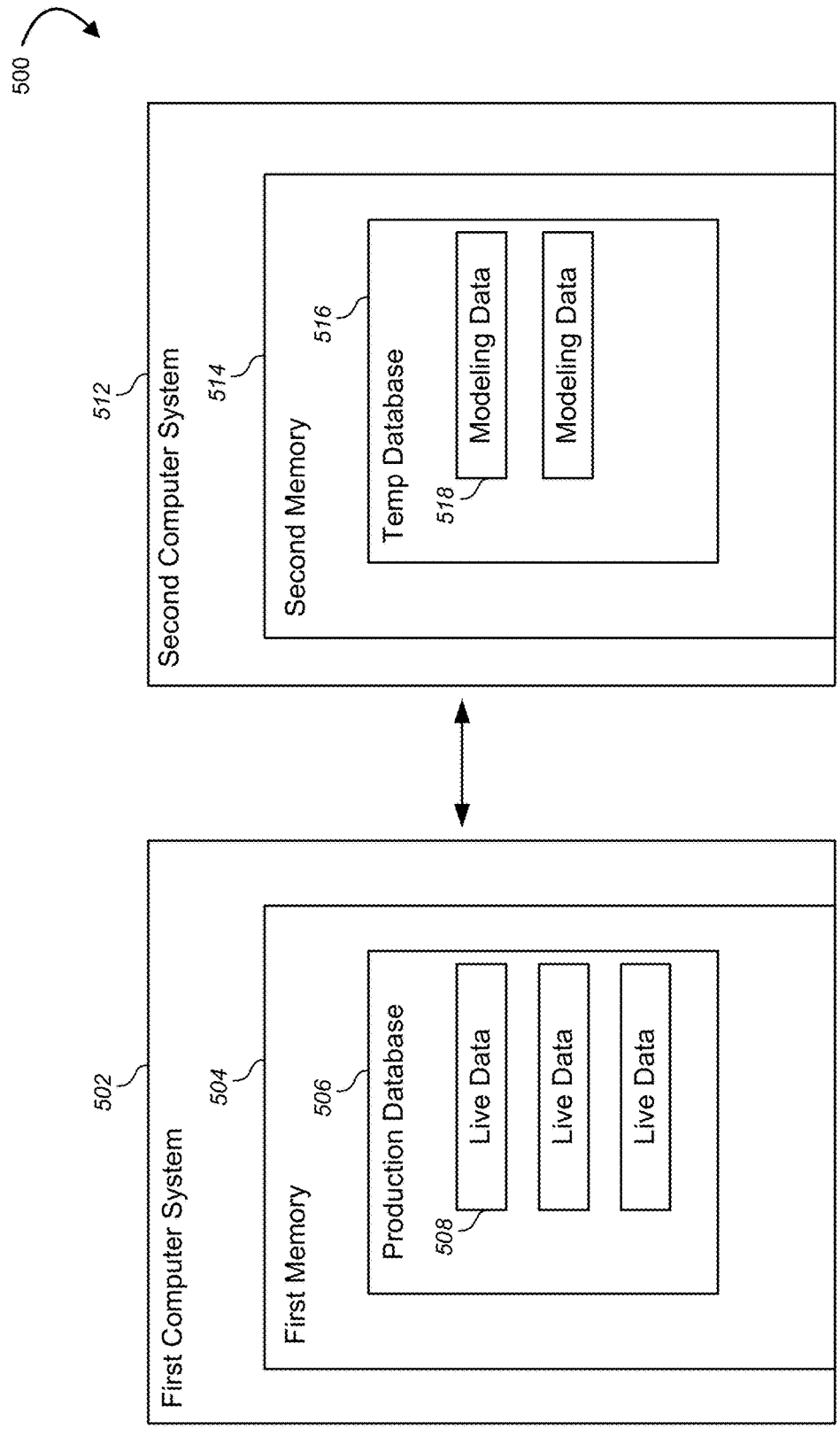
FIG. 5 illustrates a block diagram of a data storage arrangement, according to a third embodiment.

FIG. 5 illustrates a block diagram 500 of a data storage arrangement, according to a third embodiment. In this embodiment, two separate computer systems can be used. A first computer system 502 can include a first memory 504. The first memory 504 can store the production database 506 that includes the live data 508. Similarly, a second computer system 512 can include a second memory 514. The second memory 514 can store a temporary database 516 that includes the modeling data 518. As before, the modeling data 518 may comprise a subset of the live data 508 that is affected or used by a test scenario. Therefore, the first computer system 502 and/or the first memory 504 may be considered a first computing resource. Similarly, the second computer system 512 and/or the second memory 514 may be considered a second computing resource.

In this embodiment, the second computer system 512 may be significantly faster than the first computer system 502. The speed advantage may be realized by virtue of the smaller data set that the second computer system 512 is required to process. The speed advantage may also be realized by the size and speed of the second memory 514 compared to the much larger and necessarily slower first memory 504 that is required to store the entire production database. The second computer system 512 may use faster and more capable processors. The second computer system 512 may also use different memory management systems that can operate faster on smaller data sets than larger ones. The temporary database 516 may be implemented using an in-memory database, as was done in the previous embodiment.

In this embodiment, the first computer system 502 and the second computer system 512 may be physically separate from each other, and in some cases may be geographically remote from each other. In one embodiment, the first computer system 502 comprises an enterprise computing system, while the second computer system 512 may comprise a single workstation, a single server, or a set of workstations and/or servers that are especially dedicated to modeling scenarios to be later used on live data. The first computer system 502 can be communicatively coupled to the second computer system 502 by a cable connection, a local network, a wide area network, the Internet, or a wireless communication link. When a scenario is selected/defined for testing, the subset of the live data 508 can be transferred from the first memory 504 to the second memory 514 in a just-in-time fashion. Alternatively, the second computer system 512 can maintain modeling data 518 that represents the subset of live data 508 that is most likely to be used by modeling scenarios. If a particular modeling scenario is defined/selected that requires additional live data 508, such live data 508 can be transferred to the second computer system 512 before the scenario is tested.

In one embodiment, scenarios can be run on the modeling data using a second computing resource running the same type of software that is used to run scenarios on the production database. For example, general ledger software could be loaded on the second computing resource and could operate on the modeling data in the same way that general ledger software running on the first computing resource operates on the live data. In another embodiment, a scaled-down version of the production database software may be used to model scenarios on the second computing resource. Because of the smaller data sets involved, a smaller and/or less complex version of the general ledger software could be used to model scenarios. In other words, the software used for modeling may include a reduced set of functions compared to the production database software.

After scenarios are run on a subset of the live data using a second computing resource, some embodiments allow for the results to be displayed for analysis. In one embodiment, multiple scenarios can be run on common or similar data sets, and the results can be displayed side-by-side in a comparative fashion. This may allow a user to select among alternative scenarios in order to choose the most advantageous result. For example, the results of some scenarios can be displayed such that an effect on the bottom line for one or more subdivisions within an organization can be compared.

FIG. 6 illustrates an interface 600 for reviewing scenario results, according to a first embodiment. In this embodiment, scenario 602 has been run using the modeling data. Scenario 604 has also been run using the modeling data. A control 610 is provided to accept an input from a user to display results in a certain format. For example, interface 600 displays the comparative results of profits and losses, i.e. expenses and revenues for each scenario. For the scenarios, the bottom line may be considered a net income, where expenses are subtracted from revenues. Other display formats may also be used, such as a balance sheet, a statement of cash flows, and expense report, and/or the like.

In addition to the results for scenario 602 and scenario 604, a comparative column may be included to display a statistic relating the two sets of results to each other. For example, column 608 may include the variance between the results for scenario 602 and the results for scenario 604. This may allow a user to see how the different scenarios affect each of the components that make up the revenues and expenses for a department. The interface 600 may also include a control 612 that allows a user to change the parameters for one or more of scenario 602 and/or scenario 604. In other words, users may alter the inputs to reach scenario such as expenses, and allocation basis, target, a source, etc. and see the results of those changes reflected in the interface 600.

Figure 7:
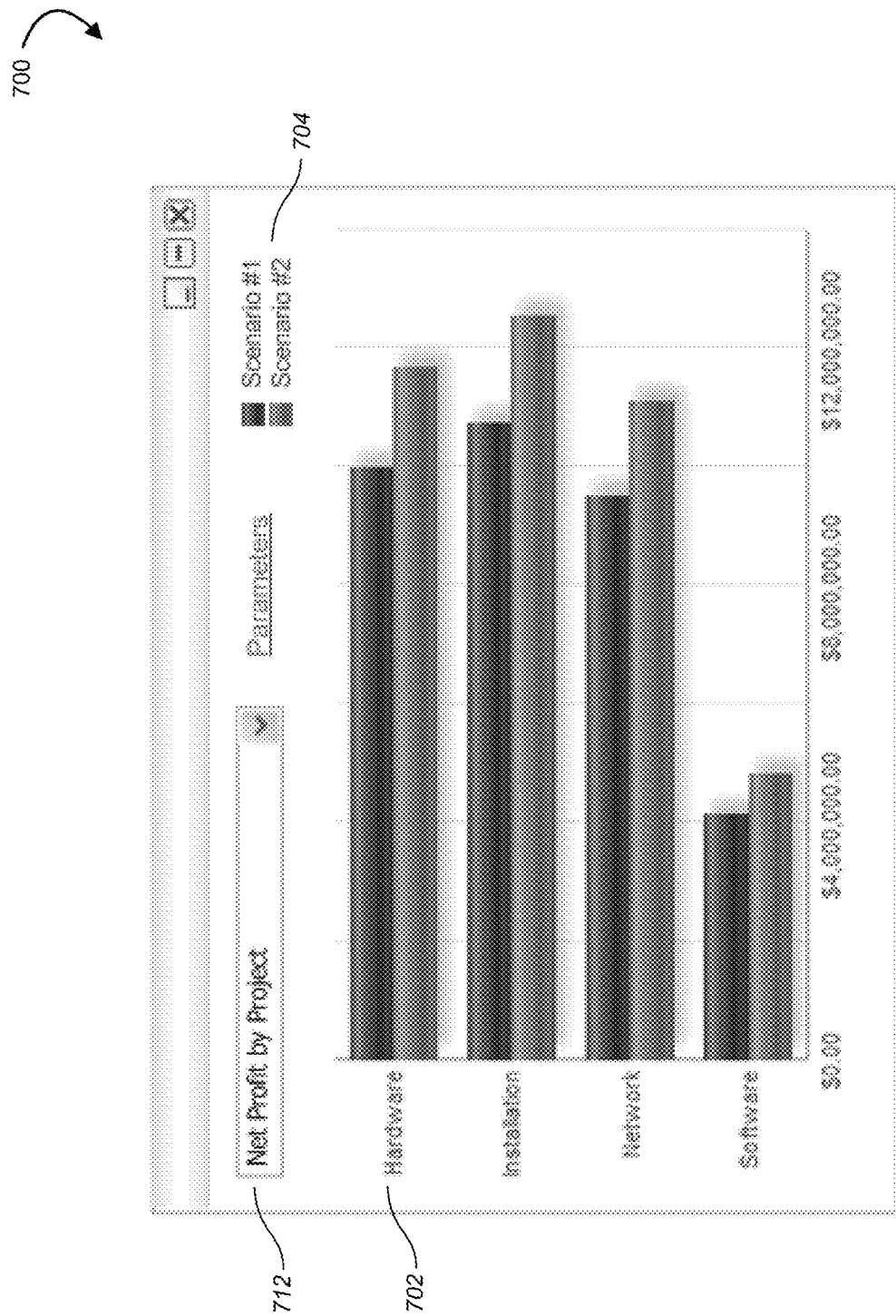
FIG. 7 illustrates an interface for reviewing scenario results, according to a second embodiment.

FIG. 7 illustrates an interface 700 for reviewing scenario results, according to a second embodiment. This embodiment is similar to interface 600, but the control 712 can be used to compare the results of two scenarios by net profit according to various projects. For example, project may be divided into categories 602, such as hardware, installation, network, and/or software. The results of each scenario 704 can be displayed side-by-side using, for example, a bar graph, histogram, and/or the like.

Figure 8:
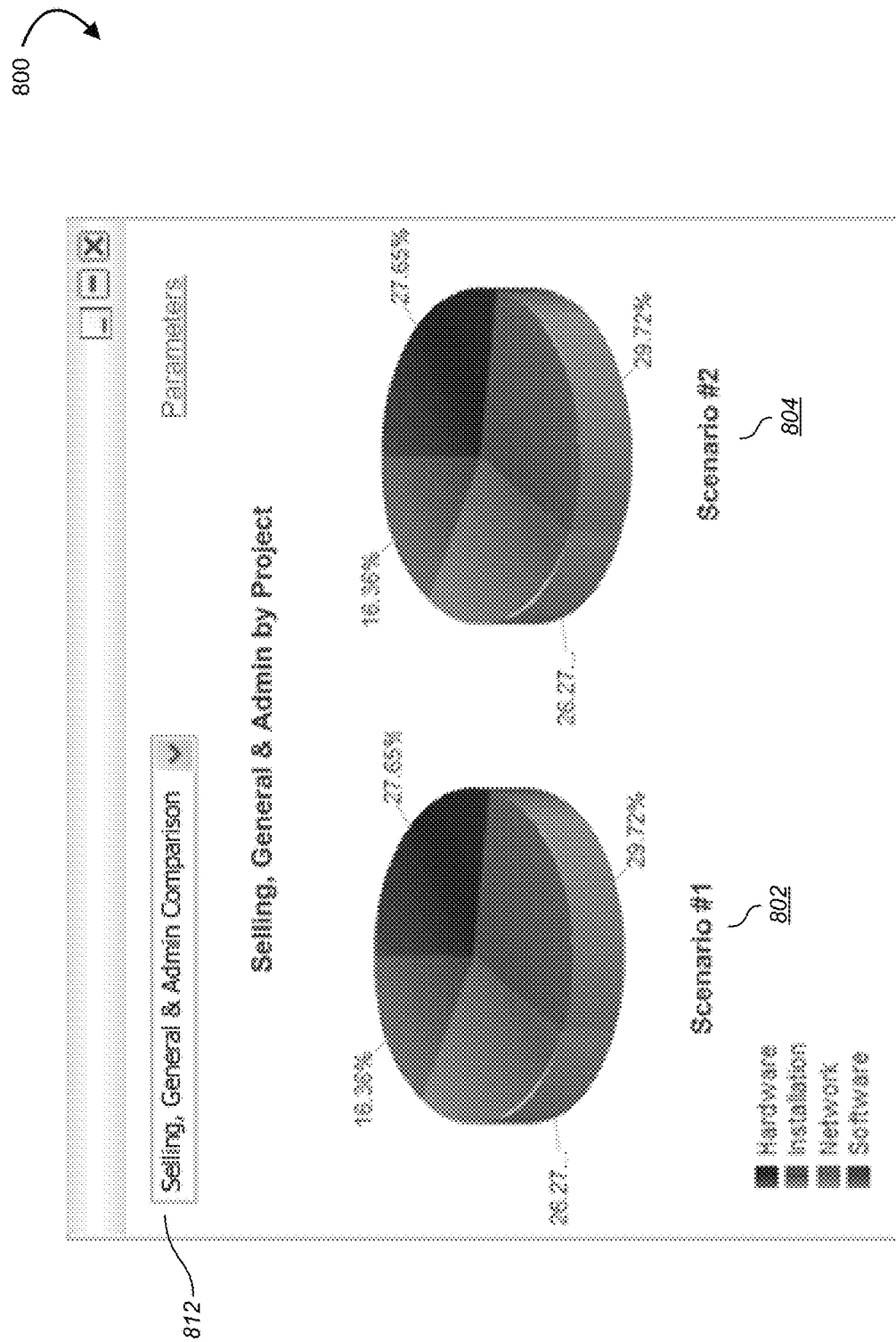
FIG. 8 illustrates an interface for reviewing scenario results, according to a third embodiment.

FIG. 8 illustrates an interface 800 for reviewing scenario results, according to a third embodiment. In this embodiment, the control 812 can be selected to show a comparison between the sales in various projects. Again, scenario 802 and scenario 804 can have their results displayed in a comparative fashion such that a user can select between the desired results and have the corresponding scenario sent to the production database.

Figure 9:
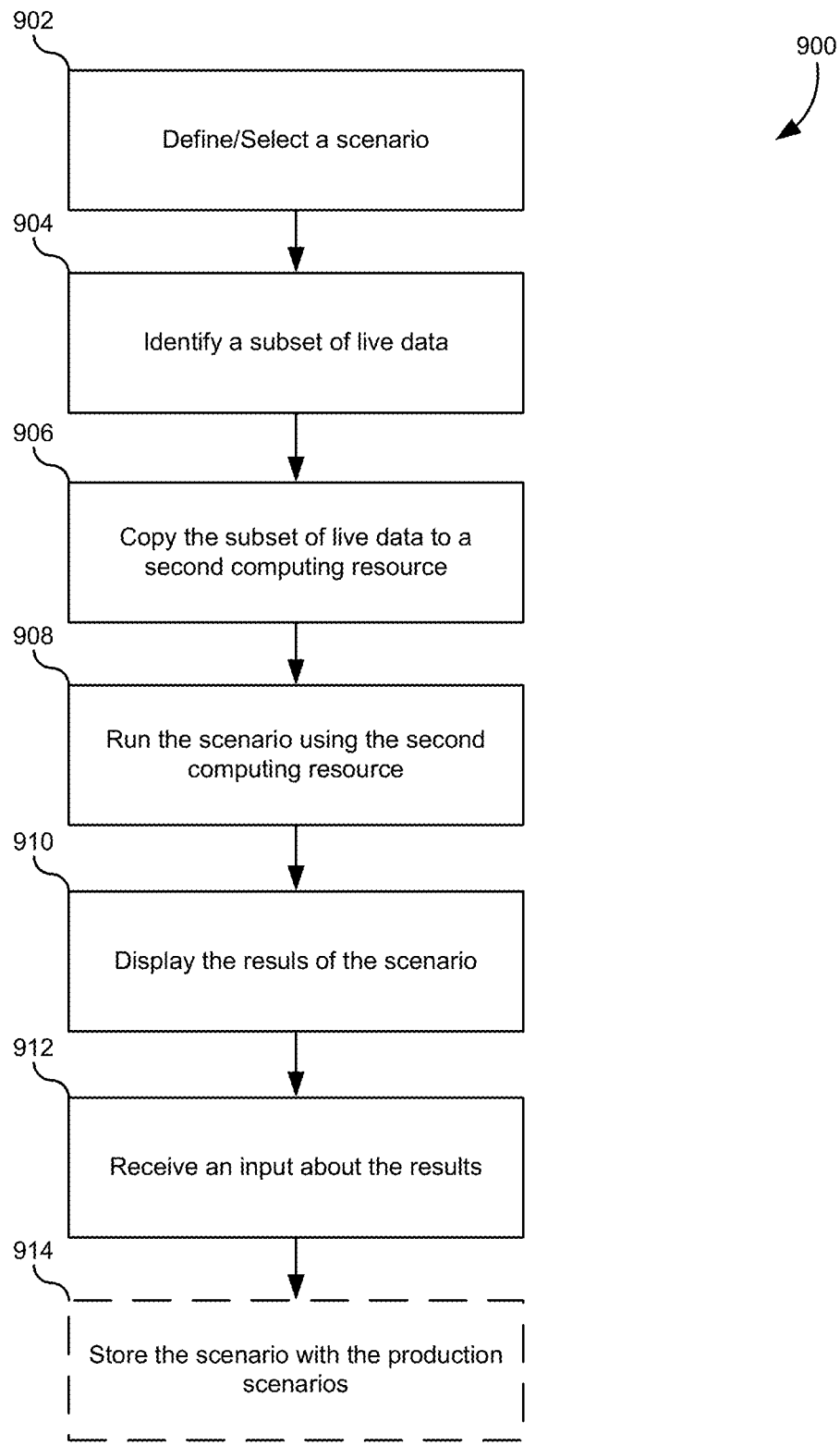
FIG. 9 illustrates a flowchart of a method of efficiently modeling a scenario for use with live data in a production database, according to one embodiment.

FIG. 9 illustrates a flowchart 900 of a method of efficiently modeling a scenario for use with live data in a production database, according to one embodiment. The method may include defining or selecting a modeling scenario (902). In one embodiment, the scenario may be selected from a list of previously stored scenarios. In another embodiment, the scenario may be selected from a list of existing scenarios in the production database that can then be altered for modeling. In another embodiment, an interface may be provided such that a user can build scenarios from existing application processes and/or business processes. For example, an interface may be provided that allows a user to specify a target, source, and basis for an allocation rule. Users may also select multiple scenarios and combine them into single scenarios for modeling.

The scenario to be modeled can be intended for eventual use on live data in the production database. As described above, the live data can be stored in the production database and maintained by a first computing resource. The first computing resource can also store a plurality of production scenarios that are to be executed on live data periodically or according to user inputs. For example, scenarios related to an accounting period close maybe stored by the first computing resource. The first computing resource can run general ledger or project tracking components of an Enterprise software system. Generally, the production database and the first computing resource may not provide an optimal means for modeling the scenario, due to their size, speed, and/or availability.

The method may further include identifying a subset of the live data that is affected by the scenario. In one embodiment, the user may manually select certain data sets that are to be included in the subset of live data. In another embodiment, after selecting or defining a scenario to be modeled, the method may automatically determine which live data will be affected by the scenario. In this case, the user may not be required to determine or select which data is needed, but rather the method may perform this step automatically using a processor of the computer system. In another embodiment, certain subsets of the live data, such as certain accounting ledgers or data associated with certain departments, may be identified as likely to be needed for modeling operations. The method may automatically keep up-to-date versions of these portions of the live data separately stored for use in any modeling operations. In this case, the method may automatically determine if any of the live data required by the modeling scenario is not already separately available in the subset, and may in response retrieve the missing live data from the production database.

The method may additionally include copying the subset of the live data to a second computing resource to create modeling data (906). In one embodiment, the subset of the live data need not be copied all at one time or in one operation. For example, where subsets of live data that are identified as being likely candidates for modeling operation are identified beforehand, these data may be transferred to the second computing resource at a time far prior to the other steps in this method. In the embodiment where the second computing resource comprises a separate memory location within the production database, these memory locations can be allocated and/or populated at this time. In embodiments where the second computing resource comprises a separate memory within the same computer system, the subset of live data can be transferred between memories according to a memory bus architecture. In embodiments where the second computing resource comprises a separate computer system, the subset of live data can be transferred using a network connection that is either wired or wireless.

As discussed above, the second computing resource can be configured to run the scenario faster than the first computing resource. In one embodiment, this may be due to the speed of the memory that stores the modeling data compared to the speed of the memory that stores the live data. In other embodiments, the speed differential may be due to different processing power, different architectures, or simply attributable to the comparative size of the modeling data compared to the live data. Specifically, running the scenario on the modeling data using the first computer resource may take a first amount of time; running the scenario on the modeling data using the second computing resource may take a second amount of time; and the first amount time may be greater than the second amount time. In one embodiment, the first amount of time may be at least 5 times greater than the second amount of time. In other embodiments, the first amount of time may be 2, 10, 15, or 20 times greater than the second amount of time.

The method may also include running the scenario on the modeling data using the second computing resource (908). In one embodiment, this may include generating and storing the results of the scenario using the second computing resource. Note that in embodiments where the second computing resource comprises a separate memory location, similar processing capabilities may be used to both model the data and operate the production database.

The method may also include causing a display device to provide an output comprising a result of the scenario on the modeling data (910). In one embodiment, this step may comprise displaying an interface on a computer screen, such as interface 600, interface 700, and/or interface 800. As described above, multiple scenarios may be modeled using common data sets, and the results may be displayed in a comparative fashion. Specifically, a second scenario can be modeled on the subset of the live data that alters one or more aspects of the first scenario. The altered aspect may include additional live data not originally included in the modeling data, or it may alter a rule or order of operations in the original scenario. The second scenario may be run either serially or parallel with the first scenario, and the result may be displayed together on the display device. The output may comprise the result of the second scenario on the modeling data, along with a comparison of the results of the first scenario on the modeling data.

The method may additionally include receiving an input indicating that the scenario is approved to be run on the first computing resource (912). Additionally, any input may be received indicating that the scenario is not approved to be run on the first computing resource. In other words, the user may select whether to accept or reject the results of the scenario. In another embodiment, the user may further refine the parameters of the scenario and rerun the scenario using the new parameters. The user may then be able to select between the original scenario and the altered scenario by comparing the results and approving one over the other. In the embodiment where multiple scenarios can be run and displayed together, the input may additionally indicate that one scenario is preferred over the others.

The method may optionally include storing the scenario with the plurality of production scenarios for use on the first computing resource (914). The input can select one or more scenarios that are approved for use with the live data. The method may then transfer the new or altered scenario into the plurality of production scenarios. In other words, the modeled scenario can be included in the group of scenarios that are run on the live data of the production database using the first computing resource. For example, an allocation rule can be modeled, and the results displayed such that a user can approve the allocation rule for operating on the live data. The allocation rule can then be copied into a general ledger system and run periodically as a part of various accounting operations for the organization.

Typically, only the selected one or more scenarios will be stored on the production database for use with live data. The actual results of these scenarios on the modeling data are not then stored in the production database. In some cases, the live data may have changed between the time when the modeling data was created and when the results of the scenario were computed. Therefore, the results of the scenario stored in the modeling data may not reflect the correct values that would be obtained using the up-to-date live data. However, in one embodiment, the actual values generated by the modeling scenario in the modeling data may be imported into the production database and used thereafter as live data. This embodiment may be useful when a user would like to run a scenario quickly using the modeling data capabilities and then move the actual results into the production database. There may also be times when the user knows that the modeling data will reflect the live data in cases where it is known beforehand the live data not be altered during the modeling process.

It should be appreciated that the specific steps illustrated in FIG. 9 provides particular methods of modeling scenarios according to various embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
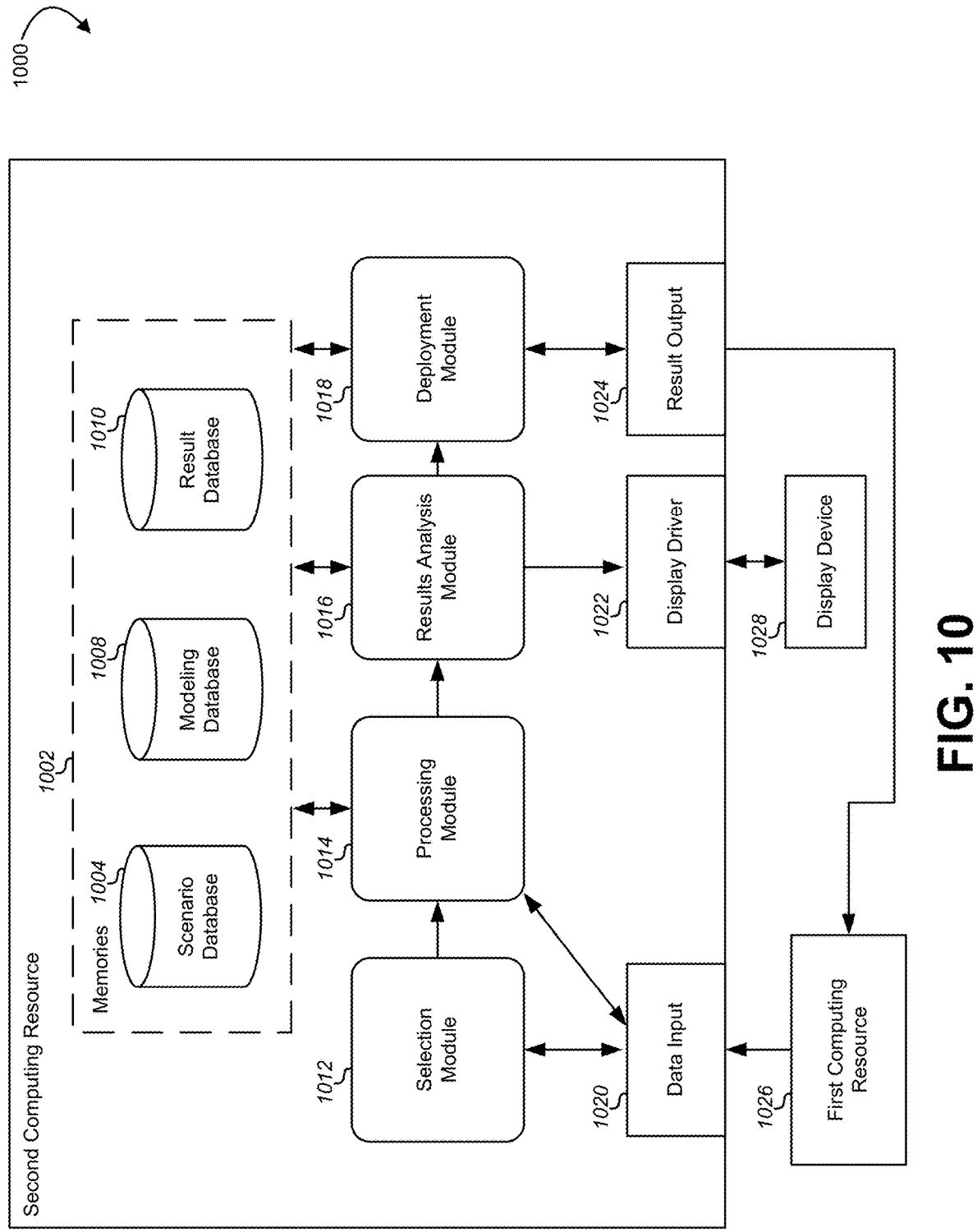
FIG. 10 illustrates a system for efficiently modeling a scenario for use with live data in a production database, according to one embodiment.

FIG. 10 illustrates a block diagram 1000 of a system for efficiently modeling a scenario for use with live data in a production database, according to one embodiment. The system may include a second computing resource 1030 configured to model scenarios for later use on live data in the production database. The second computing resource 1030 may include various data stores 1002, such as a scenario database 1004, a modeling database 1008, and a result database 1010, along with other similar data stores not explicitly shown. The various data stores 1002 can store a history of modeled scenarios, global variables and parameters to be used during the modeling process, and results from previously modeled scenarios. The various data stores 1002 may be implemented in the form of any hardware memory, and may use common database software.

The second computing resource may also include a selection module 1012 configured to present a list of scenarios to a user for modeling. The selection module 1002 may also be configured to receive the automatic selection of a module from a first computing resource as part of an automated process. The selection module 1012 may also be configured to allow a user to define a new scenario by presenting fields and rules that can be combined to form application processes and/or business processes. A data input 1020 may be communicatively coupled to a first computing resource 1026, and may receive the subset of live data through a port or communication channel. The data input may provide scenarios to the selection module 1012 and/or the subset of live data to a processing module 1014.

The processing module 1014 may include hardware and/or software configured to run the scenario on the modeling data and provide results to a result analysis module 1016 or to one or more of the various data stores 1002. The processing module may include implementations of functions that are used on the first computing resource 1026 in relation to the production database during normal operations. The result analysis module 1016 may be implemented using hardware logic or software functions configured to generate comparative statistics between one or more modeled scenarios. The result analysis module 1016 may store the results as well as any generated statistics in the various data stores 1002, and may provide the results to a display driver 1022.

The display driver 1022 may be configured to manipulate the result data into a format that can be displayed in a comparative fashion on a display device 1028. In one embodiment, the display device comprises a computer monitor that a user may analyze. In another embodiment, the results analysis module 1016 may also provide the modeling results to another automated process operating on either the first or second computer resource. For example, a process may be configured to automatically select between modeling scenarios based on results that generate the most beneficial bottom line for an organization. The data input 1020 receive a selection of one or more scenarios from either a user or another process to be deployed onto the production database. The deployment module 1018 can prepare the one or more selected scenarios for deployment, and provide them to the first computing resource 1026 through a result output interface 1024. The first computing resource 1026 can then schedule the one or more selected scenarios for periodic execution, or may execute them immediately, depending on the embodiment.

In one embodiment, the various modules and systems in FIG. 10 may reside on separate computer systems. Alternatively, multiple modules may be combined on the same or similar computer systems. In addition, some modules may be combined together into a single module performing the functions of both individual modules. Similarly, a single module may be split into multiple modules. In one particular embodiment, the system may be implemented entirely in hardware, using hardware such as the hardware described in relation to FIG. 2. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:
receiving one or more inputs that correspond to a selection of one or more fields and one or more rules;
defining software configured to model a scenario by combining the one or more fields with the one or more rules to generate one or more executable application processes, wherein data for which the scenario applies is stored in a production database in a first computing system, and wherein a set of functions in the software configured to model the scenario is smaller than a set of functions in corresponding production software configured to execute the scenario in a live-data context;
identifying, by the first computing system, a subset of the data, the subset of the data being affected or used by the software configured to model the scenario;
determining that a copy of some of the data is located on a second computing system, the copy of some of the data including a first portion of the subset of the data;
determining a difference between the subset of the data and the first portion of the subset of the data that is located on the second computing system, the difference corresponding to a remaining portion of the subset of the data that is not located on the second computing system;
transferring, by the first computing system, the remaining portion of the subset of the data to the second computing system;
generating modeling data, the modeling data being based on the subset of the data that includes the first portion of the subset of the data and the remaining portion of the subset of the data;
storing, in the second computing system, the modeling data;
executing, by the second computing system, the software configured to model the scenario to transform the modeling data to generate a result;
displaying, by the second computing system, a presentation of an output comprising the result of the execution of the software configured to model the scenario to transform the modeling data;
overwriting a portion of live data in the production database with the result of the execution of the software configured to model the scenario to transform the modeling data;
detecting, in response to the presentation, an input indicating that the scenario is approved for execution; and
in response to detecting the input indicating that the scenario is approved for execution, transferring, by the second computing system, the scenario to the first computing system, wherein the production software configured to model the scenario is configured to be executed repeatedly, by the first computing system, to manipulate live data of the production database.

2. The method of claim 1, wherein the scenario comprises an allocation rule comprising a basis selected from the live data.

3. The method of claim 1, wherein the scenario comprises a process comprising a plurality of allocation rules, wherein one or more of the plurality of allocation rules comprises a basis selected from the live data.

4. The method of claim 1, wherein:
the first computing system comprises a first one or more memories; and
the second computing system comprises a second one or more memories, wherein the second one or more memories are faster than the first one or more memories.

5. The method of claim 1, wherein the first computing system is physically remote from the second computing system.

6. The method of claim 1, wherein:
running the software configured to model the scenario on the live data in the first computing system takes a first amount of time;
running the production software configured to model the scenario on the modeling data in the second computing system takes a second amount of time; and
the first amount of time is a least five times greater than the second amount of time.

7. The method of claim 1, wherein the scenario comprises a first scenario, the method further comprising:
identifying a second scenario to be modeled, wherein:
the second scenario alters one or more aspects of the first scenario; and
the second scenario uses at least a portion of the modeling data; and
processing, by the second computing system, the modeling data using other software to model the second scenario to produce an output, wherein:
the output further comprises:
a second result of the processing of the modeling data using the other software to model the second scenario; and
a comparative column including a variance between the result and the second result; and
the detected input further indicates that the first scenario is preferred over the second scenario.

8. The method of claim 1, wherein the result of the scenario on the modeling data comprises a predicted revenue for a department.

9. The method of claim 1, wherein defining the software configured to model the scenario includes at least one of: selecting a scenario from a list of scenarios, combining multiple scenarios into a single scenario, and building a new scenario.

10. The method of claim 1, further comprising:
detecting, an input indicating that the scenario is not approved for execution;
generating, by the second computing system, a modified scenario by refining one or more parameters of the scenario;
rerunning, by the second computing system, the modeling data using the modified scenario; and
displaying, by the second computing system, a presentation of an output comprising a result of the scenario on the modeling data and a result of the modified scenario on the modeling data, the output including a comparative column including a variance between the result of the scenario on the modeling data and the result of the modified scenario on the modeling data; and
approving the scenario or the modified scenario for execution on the live data.

11. A non-transitory computer-readable memory having stored thereon a sequence of instructions which, when executed by one or more processors, causes the one or more processors to operate by:
receiving one or more inputs that correspond to a selection of one or more fields and one or more rules;
defining software configured to model a scenario by combining the one or more fields with the one or more rules to generate one or more executable application processes, wherein data for which the scenario applies is stored in a production database in a first computing system, and wherein a set of functions in the software configured to model the scenario is smaller than a set of functions in corresponding production software configured to execute the scenario in a live-data context;
identifying, by the first computing system, a subset of the data, the subset of the data being affected or used by the software configured to model the scenario;
determining that a copy of some of the data is located on a second computing system, the copy of some of the data including a first portion of the subset of the data;
determining a difference between the subset of the data and the first portion of the subset of the data that is located on the second computing system, the difference corresponding to a remaining portion of the subset of the data that is not located on the second computing system;
transferring, by the first computing system, the remaining portion of the subset of the data to the second computing system;
generating modeling data, the modeling data being based on the subset of the data that includes the first portion of the subset of the data and the remaining portion of the subset of the data;
storing, in the second computing system, the modeling data;
executing, by the second computing system, the software configured to model the scenario to transform the modeling data to generate a result;
displaying, by the second computing system, a presentation of an output comprising the result of the execution of the software configured to model the scenario to transform the modeling data;
overwriting a portion of the of live data in the production database with the result of the execution of the software configured to model the scenario to transform the modeling data;
detecting, in response to the presentation, an input indicating that the scenario is approved for execution; and
in response to detecting the input indicating that the scenario is approved for execution, transferring, by the second computing system, the scenario to the first computing system, wherein the production software configured to model the scenario is configured to be executed repeatedly, by the first computing system, to manipulate live data of the production database.

12. The non-transitory computer-readable memory according to claim 11, wherein:
the first computing system comprises a first one or more memories; and
the second computing system comprises a second one or more memories, wherein the second one or more memories are faster than the first one or more memories.

13. The non-transitory computer-readable memory according to claim 11, wherein:
running the production software configured to model the scenario on the live data in the first computing system takes a first amount of time;
running the software configured to model the scenario on the modeling data in the second computing system takes a second amount of time; and
the first amount of time is a least five times greater than the second amount of time.

14. The non-transitory computer-readable memory according to claim 11, wherein the scenario comprises a first scenario, the instructions further causing the one or more processors to operate by:
identifying a second scenario to be modeled, wherein:
the second scenario alters one or more aspects of the first scenario; and
the second scenario uses at least a portion of the modeling data; and
processing, by the second computing system, the modeling data using other software to model the second scenario to produce an output, wherein:
the output further comprises:
a second result of the processing of the modeling data using the other software to model the second scenario; and a comparative column including a variance between the result and the second result; and the detected input further indicates that the first scenario is preferred over the second scenario.

15. A system comprising:
a first and second computing systems;
one or more processors; and
a memory communicatively coupled with and readable by the one or more processors and having stored therein a sequence of instructions which, when executed by the one or more processors, cause the one or more processors to operate by:
    receiving one or more inputs that correspond to a selection of one or more fields and one or more rules;
    defining software configured to model a scenario by combining the one or more fields with the one or more rules to generate one or more executable application processes, wherein data for which the scenario applies is stored in a production database in a first computing system, and wherein a set of functions in the software configured to model the scenario is smaller than a set of functions in corresponding production software configured to execute the scenario in a live-data context;
    identifying, by the first computing system, a subset of the data, the subset of the data being affected or used by the software configured to model the scenario;
    determining that a copy of some of the data is located on a second computing system, the copy of some of the data including a first portion of the subset of the data;
    determining a difference between the subset of the data and the first portion of the subset of the data that is located on the second computing system, the difference corresponding to a remaining portion of the subset of the data that is not located on the second computing system;
    transferring, by the first computing system, the remaining portion of the subset of the data to the second computing system;
    generating modeling data, the modeling data being based on the subset of the data that includes the first portion of the subset of the data and the remaining portion of the subset of the data;
    storing, in the second computing system, the modeling data;
    executing, by the second computing system, the software configured to model the scenario to transform the modeling data to generate a result;
    displaying, by the second computing system, a presentation of an output comprising the result of the execution of the software configured to model the scenario to transform the modeling data;
    overwriting a portion of live data in the production database with the result of the execution of the software configured to model the scenario to transform the modeling data;
    detecting, in response to the presentation, an input indicating that the scenario is approved for execution; and
    in response to detecting the input indicating that the scenario is approved for execution, transferring, by the second computing system, the scenario to the first computing system, wherein the production software configured to model the scenario is configured to be executed repeatedly, by the first computing system, to manipulate live data of the production database.

16. The system of claim 15, wherein the result of the scenario on the modeling data comprises a revenue for a department.

17. The system of claim 15, wherein the scenario comprises an allocation rule comprising a basis selected from the live data.

18. The system of claim 15, wherein the first computing system is physically remote from the second computing system.

19. The system of claim 15, wherein the scenario comprises a first scenario, the instructions further causing the one or more processors to operate by:
    identifying a second scenario to be modeled, wherein:
    the second scenario alters one or more aspects of the first scenario; and
    the second scenario uses at least a portion of the modeling data; and
    processing, by the second computing system, the modeling data using other software to model the second scenario to produce an output, wherein:
    the output further comprises:
        a second result of the processing of the modeling data using the other software to model the second scenario; and
        a comparative column including a variance between the result and the second result; and
    the input further indicates that the first scenario is preferred over the second scenario.

\* \* \* \* \*

UNITED STATES PATENT AND TRADEMARK OFFICE
CERTIFICATE OF CORRECTION

| | | |
|---|---|---|
| PATENT NO. | : 11,449,952 B2 | |
| APPLICATION NO. | : 13/632642 | |
| DATED | : September 20, 2022 | |
| INVENTOR(S) | : Yeung et al. | |

It is certified that error appears in the above-identified patent and that said Letters Patent is hereby corrected as shown below:

In the Drawings

On sheet 9 of 10, in FIG. 9, and on the Title Page, the illustrative figure, under Reference Numeral 910, Line 1, delete "resuls" and insert -- results --, therefor.

In the Claims

In Column 16, Line 66, in Claim 6, delete "a" and insert -- at --, therefor.

In Column 18, Line 21, in Claim 11, after "portion" delete "of the", therefor.

In Column 18, Line 50, in Claim 13, delete "a" and insert -- at --, therefor.

Signed and Sealed this
Fourteenth Day of February, 2023

Katherine Kelly Vidal
*Director of the United States Patent and Trademark Office*